United States Patent
Liang

(10) Patent No.: US 9,273,558 B2
(45) Date of Patent: Mar. 1, 2016

(54) SAW TEETH TURBULATOR FOR TURBINE AIRFOIL COOLING PASSAGE

(71) Applicant: Siemens Energy, Inc., Orlando, FL (US)

(72) Inventor: George Liang, Palm City, FL (US)

(73) Assignee: Siemens Energy, Inc., Orlando, FL (US)

( * ) Notice: Subject to any disclaimer, the term of this patent is extended or adjusted under 35 U.S.C. 154(b) by 403 days.

(21) Appl. No.: 14/159,817

(22) Filed: Jan. 21, 2014

(65) Prior Publication Data

US 2015/0275676 A1    Oct. 1, 2015

(51) Int. Cl.
*F01D 5/18*    (2006.01)
*F01D 5/14*    (2006.01)

(52) U.S. Cl.
CPC . *F01D 5/18* (2013.01); *F01D 5/147* (2013.01)

(58) Field of Classification Search
CPC ............... F05D 2240/126; F05D 2240/127; F05D 2260/221; F05D 2260/2212; F05D 2260/2214; F05D 2260/22141
See application file for complete search history.

(56) References Cited

U.S. PATENT DOCUMENTS

| | | | | | |
|---|---|---|---|---|---|
| 5,361,828 | A | * | 11/1994 | Lee et al. ................... | 165/109.1 |
| 5,538,394 | A | * | 7/1996 | Inomata et al. ............. | 416/97 R |
| 6,257,831 | B1 | * | 7/2001 | Papple et al. ............... | 416/97 R |
| 7,581,927 | B2 | * | 9/2009 | Cunha ......................... | 416/96 R |
| 7,637,720 | B1 | * | 12/2009 | Liang .......................... | 416/96 R |
| 7,699,583 | B2 | * | 4/2010 | Cunha ......................... | 416/97 R |
| 2006/0051208 | A1 | * | 3/2006 | Lee et al. .................... | 416/97 R |

* cited by examiner

*Primary Examiner* — Craig Kim
*Assistant Examiner* — Jason Davis

(57) ABSTRACT

A trip strip having a saw-tooth configuration that has application for cooling flow channels in a blade of a gas turbine engine. The saw-tooth configuration is defined by trip strip sections positioned end-to-end, where a leading edge of a trip strip section has a lower height than a trailing end of the trip strip section, and where the next trip strip section having the lower height leading edge disrupts the vortex created by the preceding trip strip section so that its size is reduced.

20 Claims, 5 Drawing Sheets

SAW TEETH TURBULATOR FOR TURBINE AIRFOIL COOLING PASSAGE

BACKGROUND OF THE INVENTION

1. Field of the Invention

This invention relates generally to a trip strip that provides a turbulated air flow within cooling channels in a blade of a gas turbine engine and, more particularly, to a trip strip that provides a turbulated air flow within cooling channels in a blade of gas turbine engine, where the trip strip has a saw tooth configuration.

2. Discussion of the Related Art

The world's energy needs continue to rise which provides a demand for reliable, affordable, efficient and environmentally-compatible power generation. A gas turbine engine is one known machine that provides efficient power, and often has application for an electric generator in a power plant, or engines in an aircraft or a ship. A typically gas turbine engine includes a compressor section, a combustion section and a turbine section. The compressor section provides a compressed air flow to the combustion section where the air is mixed with a fuel gas, such as propane. The combustion section includes a plurality of circumferentially disposed combustors each including an injector that injects the fuel gas into the combustor to be mixed with the air and an igniter that ignites the fuel/air mixture using an electrical discharge to generate a working gas typically having a temperature greater than 1300° C. The working gas expands through the turbine section and is directed across rows of blades therein by associated vanes. As the working gas passes through the turbine section, it causes the blades to rotate, which in turn causes a shaft to rotate, thereby providing mechanical work The temperature of the working gas is tightly controlled so that it does not exceed some predetermined temperature for a particular turbine engine design because to high of a temperature can damage various parts and components in the turbine section of the engine. However, it is desirable to allow the temperature of the working gas to be as high as possible because the higher the temperature of the working gas, the faster the flow of the gas, which results in a more efficient operation of the engine.

In certain gas engine turbine designs, a portion of the compressed air flow is also used to provide cooling for certain components in the turbine section, typically the vanes, blades and ring segments. The more cooling and/or the more efficient cooling that can be provided to these components allows the components to be maintained at a lower temperature, and thus the higher the temperature of the working gas can be. For example, by reducing the temperature of the compressed gas, less compressed gas is required to maintain the part at the desired temperature, resulting in a higher working gas temperature and a greater power and efficiency from the engine. Further, by using less cooling air at one location in the turbine section, more cooling air can be used at another location in the turbine section. In one known turbine engine design, 80% of the compressed air flow is mixed with the fuel to provide the working gas and 20% of the compressed air flow is used to cool the turbine section parts. If less of that cooling air is used at one particular location as a result of the cooling air being lower in temperature, then more cooling air can be used at other areas in the turbine section for increased cooling.

It is known in the art to provide a serpentine cooling air flow channel within the blades in the turbine section, where the air flows up one channel and down an adjacent channel in a back and forth motion before the cooling air exits the blade. In one known cooling air flow channel design, a series of specially configured turbulators or trip strips are positioned within the flow channels that cause the airflow over the trip strips to become turbulated and create an air vortex. The disturbance in the air flow provided by the trip strip augments the local heat transfer coefficient of the air and thus enhances the cooling performance. Improvements can be made to the trip strips to further enhance the cooling performance.

SUMMARY OF THE INVENTION

This disclosure describes a trip strip having a saw-tooth configuration that has application for cooling flow channels in a blade of a gas turbine engine. The saw-tooth configuration is defined by trip strip sections positioned end-to-end, where a leading edge of a trip strip section has a lower height than a trailing end of the trip strip section, and where the next trip strip section having the lower height leading edge disrupts the vortex created by the preceding trip strip section so that its size is reduced.

Additional features of the present invention will become apparent from the following description and appended claims, taken in conjunction with the accompanying drawings.

DETAILED DESCRIPTION OF THE EMBODIMENTS

Figure 1:
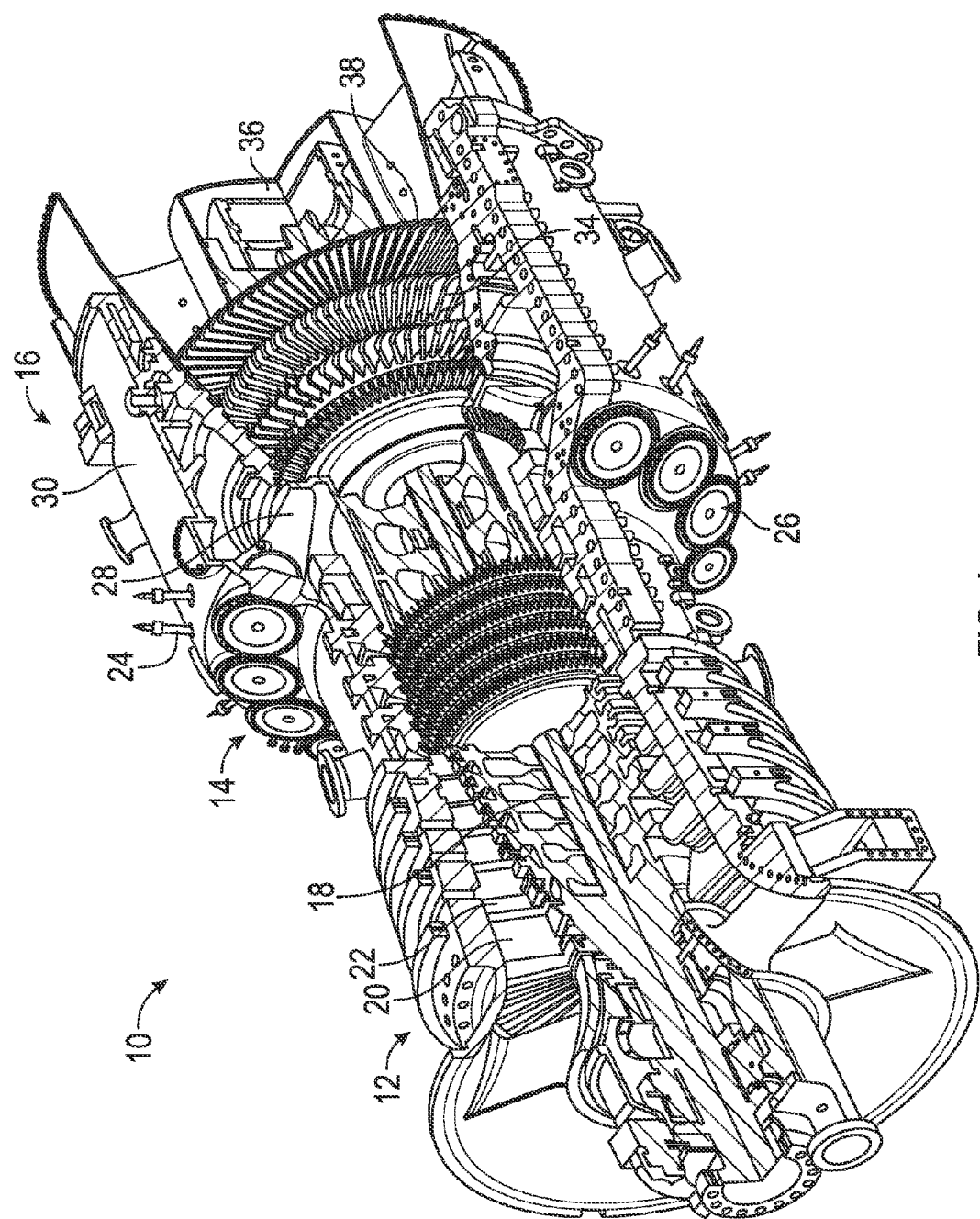
FIG. 1 is a cut-away, isometric view of a gas turbine engine.

The following discussion of the embodiments of the invention directed to a trip strip having a saw-tooth configuration for cooling flow channels within a gas turbine engine blade is merely exemplary in nature, and is in no way intended to limit the invention or its applications or uses FIG. 1 is a cut-away, isometric view of a gas turbine engine 10 including a compressor section 12, a combustion section 14 and a turbine section 16 all enclosed within an outer housing 30, where operation of the engine 10 causes a central shaft or rotor 18 to rotate, thus creating mechanical work. The engine 10 is illustrated and described by way of a non-limiting example to discuss the invention referred to below. Those skilled in the art will appreciate that other gas turbine engine designs will also benefit from the invention. Rotation of the rotor 18 draws air into the compressor section 12 where it is directed by vanes 22 and compressed by rotating blades 20 to be delivered to the combustion section 14 where the compressed air is mixed with an ignition fuel gas, such as propane, and where the fuel/air mixture is ignited to create a hot working gas. More specifically, the combustion section 14 includes a number of circumferentially disposed combustion chambers 26 each receiving the fuel gas on a line 24 that is sprayed into the chamber 26 by an injector (not shown) and mixed with the compressed air to be combusted to create the working gas, which is directed by a nozzle 28 into the turbine section 16. The working gas is directed by circumferentially disposed stationary vanes (not shown) in the turbine section 16 to flow across circumferentially disposed rotatable turbine blades 34, which causes the turbine blades 34 to rotate, thus rotating the rotor 18 Once the working gas passes through the turbine section 16 it is output from the engine 10 as an exhaust gas through an output nozzle 36.

Each group of the circumferentially disposed stationary vanes defines a row of the vanes and each group of the circumferentially disposed blades 34 defines a row 38 of the blades 34. In this non-limiting embodiment, the turbine section 16 includes four rows 38 of the rotating blades 34 and four rows of the stationary vanes in an alternating sequence. In other gas turbine engine designs, the turbine section 16 may include more or less rows of the turbine blades 34 It is noted that the most forward row of the turbine blades 34, referred to as the row 1 blades, and the vanes, referred to as the row 1 vanes, receive the highest temperature of the working gas, where the temperature of the working gas decreases as it flows through the turbine section 16.

Figure 2:
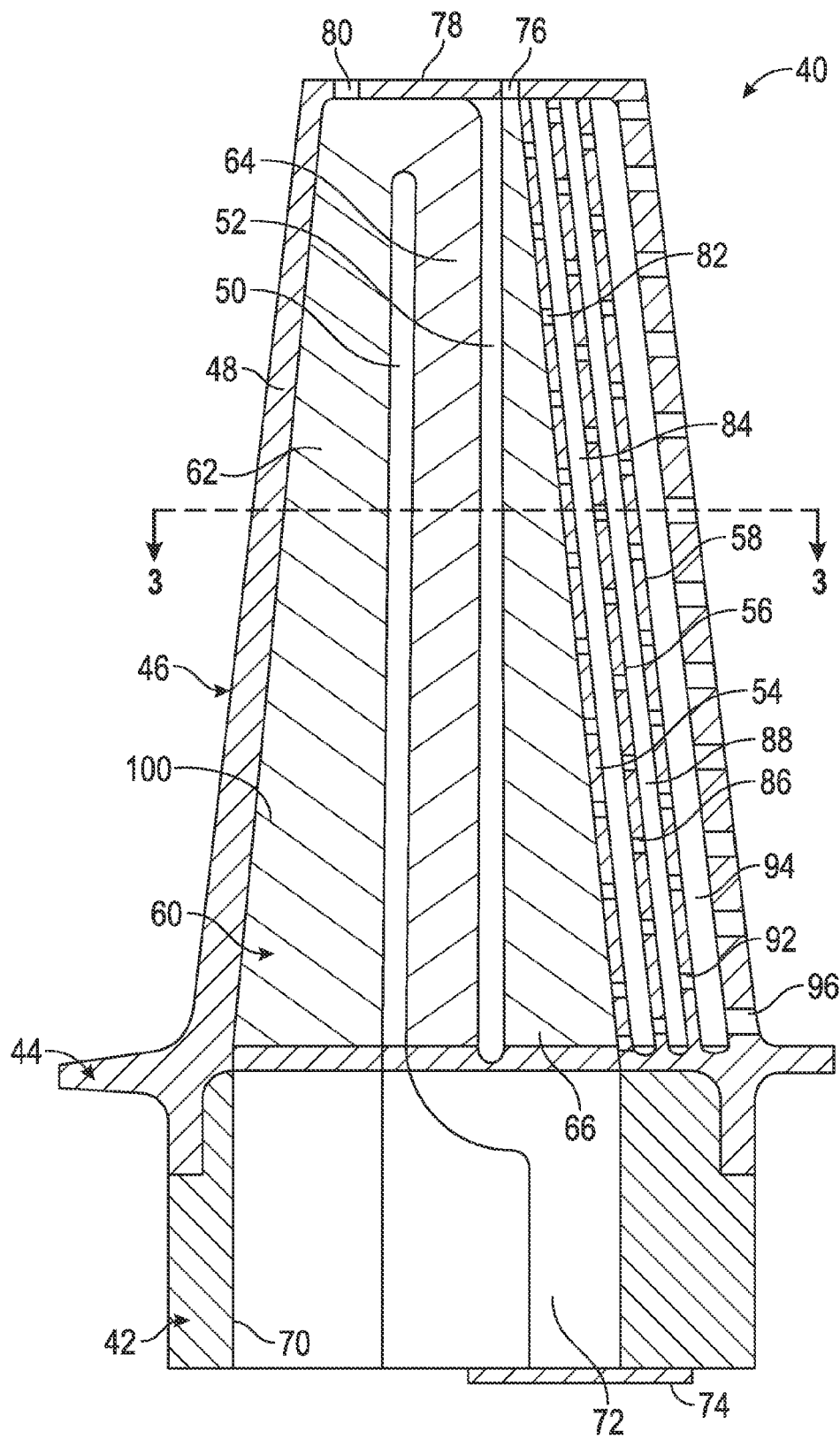
FIG. 2 is a cross-sectional view of one blade separated from the row of the blades in the gas turbine engine and showing air cooling flow channels therein.
Figure 3:
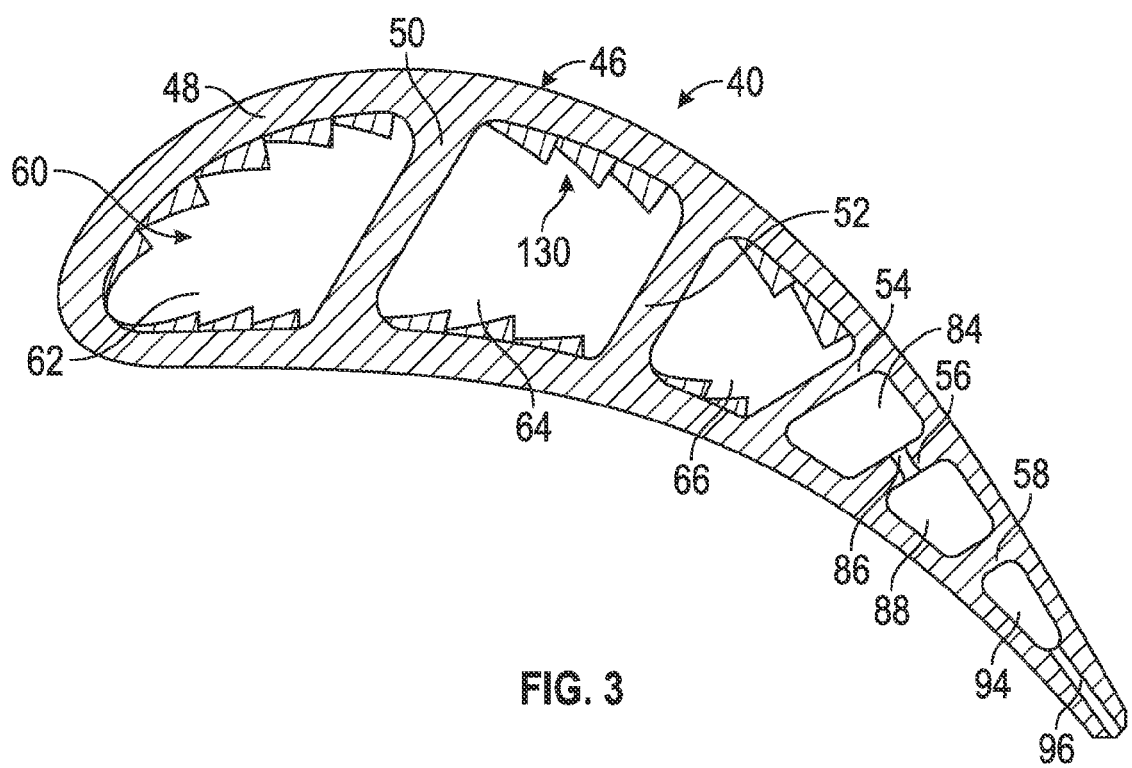
FIG. 3 is a cross-sectional view along line 3-3 of the blade shown in FIG. 2.

FIG. 2 is a cross-sectional view of an airfoil or blade 40 that is intended to represent a row 2 blade, but can be a general representation of any of the blades 34 in the rows in the gas turbine engine 10, where the blade 40 includes cooling fluid flow channels discussed in detail below. FIG. 3 is a cross-sectional view of the blade 40 along line 3-3 in FIG. 2. The blade 40 includes an attachment portion 42 that is configured to allow the blade 40 to be securely mounted to the rotor 18 in a manner well understood by those skilled in the art. A blade platform 44 is provided at a distal end of the attachment portion 42 and defines the beginning of a tapered airfoil portion 46 of the blade 40. The airfoil portion 46 includes an outer housing 48 and a number of internal ribs 50, 52, 54, 56 and 58 that define a serpentine flow channel 60 including a channel portion 62 between the outer housing 48 and the rib 50, a channel portion 64 between the ribs 50 and 52 and a channel portion 66 between the ribs 52 and 54. Air flows into the blade 40 through an input opening 70 in the attachment portion 42, enters the channel portion 62 and flows towards an end portion 78 of the housing 48, where some of the airflow exits the flow channel portion 62 through an orifice 80. The air then flows back down the blade 40 through the channel portion 64 into a chamber 72 in the attachment portion 42 that has an opening covered by a cover plate 74. The air then flows back up the blade 40 through the channel portion 66 and through an orifice 76 in the end portion 78 of the blade 40 The rib 54 includes a series of orifices 82 that allow the air to flow into a channel 84 between the ribs 54 and 56, the rib 56 includes a series of orifices 86 that allow the air to flow into a channel 88 between the ribs 56 and 58, and the rib 58 includes a series of orifices 92 that allow the air to flow into a channel 94 between the rib 58 and the outer housing 48. A series of orifices 96 in the outer housing 48 allows the air to flow out of the blade 40. As is apparent, the orifices 82, 86 and 92 in the ribs 54, 56 and 58 are staggered relative to each other so that the air does not flow directly from one channel across the next channel into the following channel. This causes the air flowing through one of the orifices to strike a section of the rib in the next channel also creating turbulence that increases the cooling effect. Particularly, this airflow effect creates vortexes inside of the channels 84, 88 and 94 that also provide turbulence for effective cooling.

Figure 4:
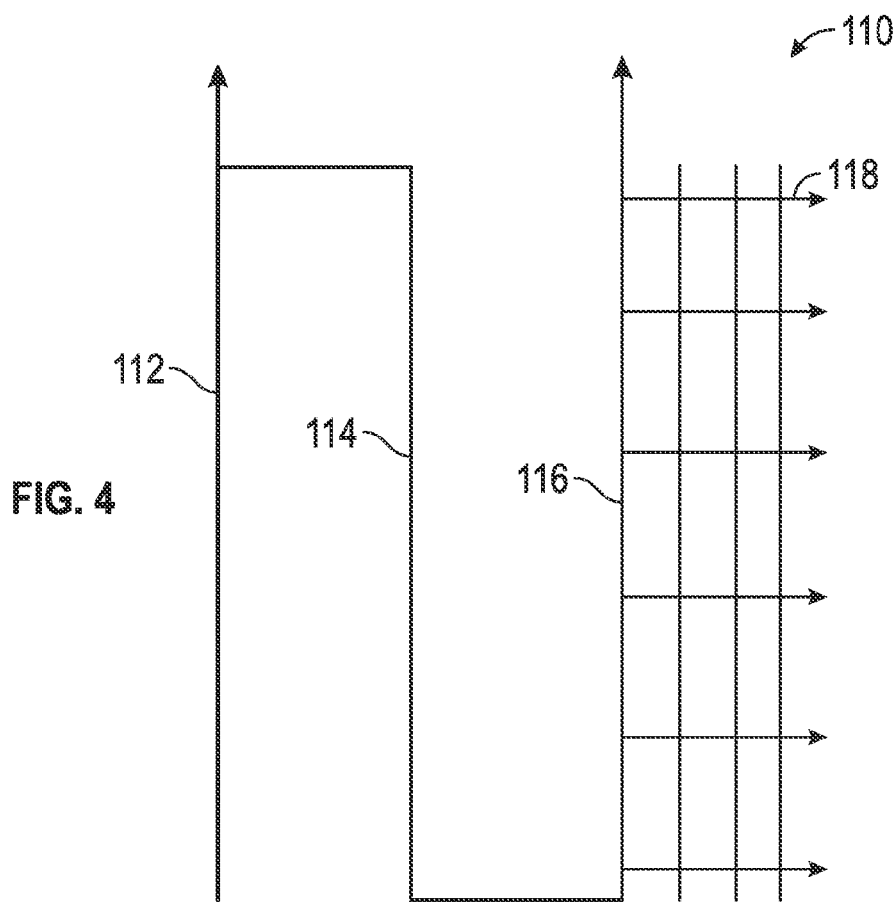
FIG. 4 is a cooling circuit showing the cooling fluid flow path in the blade shown in FIG. 2.

FIG. 4 is a graphical representation of a cooling circuit 110 showing the air flow through the airfoil portion 46 of the blade 40. Particularly, line 112 represents flow through the channel portion 62, line 114 represents flow through the channel portion 64, line 116 represents flow through the channel portion 66 and lines 118 represent flow through the orifices 82, 86, 92 and 96.

It is known in the art to provide a configuration of turbulators or trip strips mounted to the inner walls of the flow channel portions 62, 64 and 66, represented generally as reference number 100 in FIG. 2. It is noted that the discussion below will first describe known trip strips followed by a discussion of a new configuration of trip strips according to the invention, where the reference number 100 is intended to represent both in FIG. 2. As is known in the art, a trip strip for this purpose is a metal strip formed to an inside surface of the outer housing 48 of the blade 40 in a transverse direction to the flow of the cooling air. In this design, the trip strips 100 are shown as skewed trip strips in that they are angled slightly relative to the direction of the flow of the cooling air In an alternate embodiment, the trip strips 100 can be normal to the flow direction of the air. Skewed trip strips are sometimes employed over normal trip strips so as to allow the trip strip to be longer, which provides more turbulent airflow.

Figure 5:
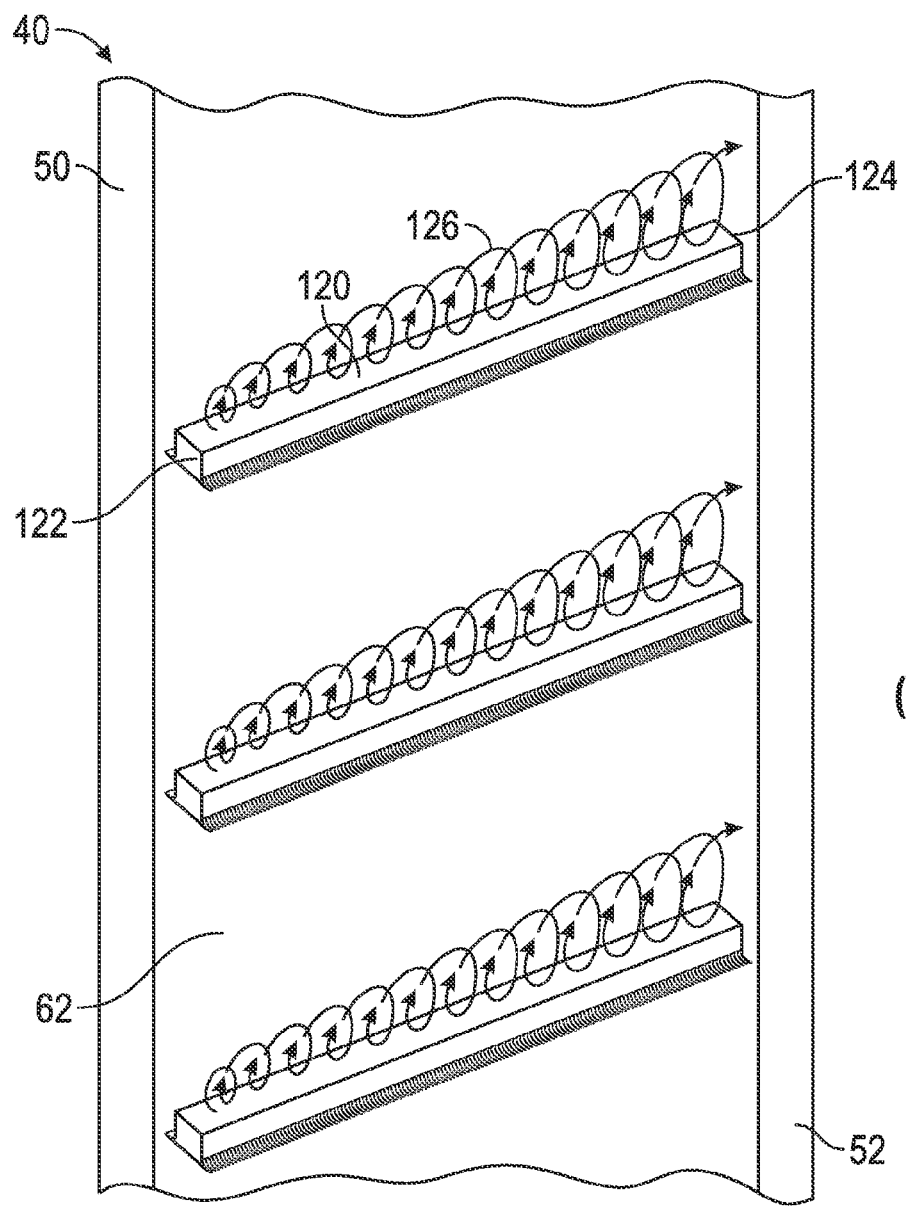
FIG. 5 is an illustration showing a number of known trip strips within the flow channels in the blade shown in FIGS. 2 and 3.
Figure 6:
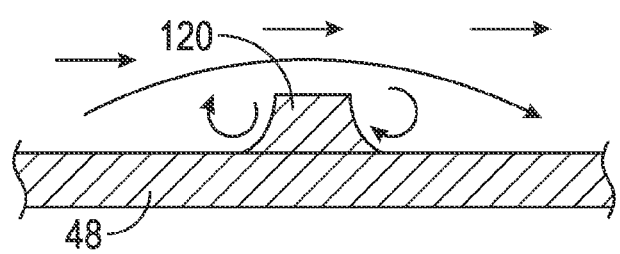
FIG. 6 is a cross-sectional view of one of the trip strips shown in FIG. 5.

FIG. 5 is an illustration of a portion of the blade 40 showing a portion of the channel portion 62. This illustration shows three known skewed trip strips 120 each including a leading edge 122 and a trailing edge 124. FIG. 6 is a cross-sectional view of one of the trip strips 120. As the air flows across the trip strip 120 in an upward direction in FIG. 5, the trip strip 120 trips the thermal boundary layer of the cooling air and causes it to generate an air vortex 126 along the length of the trip strip 120 from the leading edge 122 to the trailing edge 124. The air flow over and around the trip strip 120 is represented by arrows in FIG. 6. The configuration and orientation of the trip strips 120 causes the helical formation of the air vortex 126 to increase in size from the leading edge 122 to the trailing edge 124, i.e., increase in diameter. As the size of the vortex 126 increases the air becomes less turbulent, which reduces its effectiveness for cooling. Particularly, as the vortex 126 propagates along the full length of the trip strip 120, the boundary layer becomes progressively more disturbed or thickened, and consequently the tripping effect of the boundary layer becomes progressively less effective. The net result of this boundary layer growth is a significantly reduced heat transfer augmentation. Particularly, as the airflow hits the leading edge 122 of the trip strip 120 and the vortex 126 is created, by the time the boundary layer for that part of the airflow reaches the trailing edge 124 of the trip strip 120, the vortex 126 is already present on the trip strip 120, where the combination of the airflow in those directions increases the size of the vortex 126, which reduces the ability of the trip strip 120 to trip the airflow.

Figure 7:
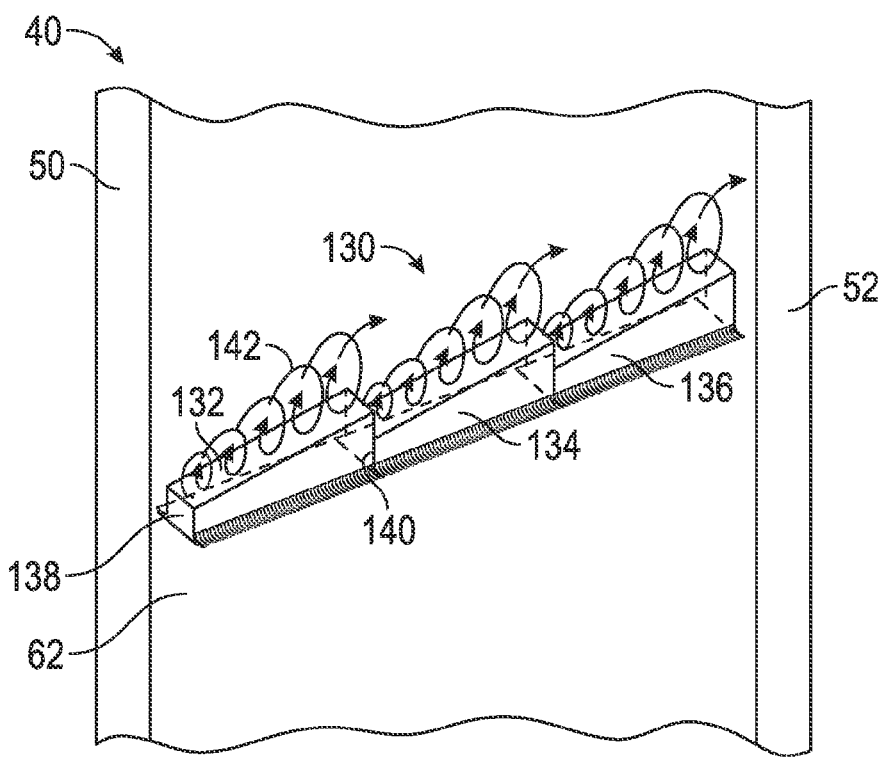
FIG. 7 is an illustration of a saw-tooth trip strip.

The present invention proposes a new configuration for the trip strip 100 that reduces the enlarging effect of the vortices and provides enhanced cooling over those trip strips known in the art. FIG. 7 is an illustration of a portion of the blade 40 showing a portion of the channel portion 62 similar to the illustration shown in FIG. 5 where the cooling flow is in an upward direction. In this new design, the trip strip 120 is replaced with a trip strip 130 including a plurality of trip strip sections, here three sections 132, 134 and 136, aligned end-to-end, where the trip strip 130 has a general saw-tooth configuration. The trip strips 130 are shown in FIG. 3, where the trip strip sections conform to the shape of the outer housing 48. Each of the trip strip sections 132, 134 and 136 has a leading edge 138 and a trailing edge 140, where the leading edge 138 has a lower height than the trailing edge 140, which gives the trip strip 130 the saw-tooth shape. By providing the saw-tooth configuration for the trip strip 130, a vortex 142 created by the air flowing over the trip strip sections 132, 134 and 136 is broken up at the trailing edge 140 of the particular trip strip section. By providing a general rise in the height of the trip strip sections 132, 134 or 138 from its leading edge 138 to its trailing edge 140, and then providing a transition between the trailing edge 140 of one trip strip section adjacent to the leading edge 138 of the next trip strip section, the transition between trip strip sections breaks the vortices so that the airflow across the trip strip 130 at this transition creates a new vortex that provides the increased thermal boundary tripping to provide the higher cooling performance.

In this non-limiting design, the trip strip 130 includes three of the trip strip sections 132, 134 and 136. However, as will be appreciated by those skilled in the art, a fewer number or more of the trip strip sections can be provided within the scope of the invention as long as the number of the trip strip sections is more than one. It is noted that the height of the leading edge 158 and the trailing edge 160 of the trip strip sections 132, 134 and 136, the skew angle of the trip strip 130, the distance between the trip strips 130, the width of the trip strip sections 132, 134 and 136, etc. are all design specific for a particular blade design. The height of the leading edge 158 of a particular trip strip section may be the same height as the leading edge 122 of the trip strip 120. The leading and trailing edges of the trip strip sections 132, 134 and 136 may be the same or different heights.

Figure 8:
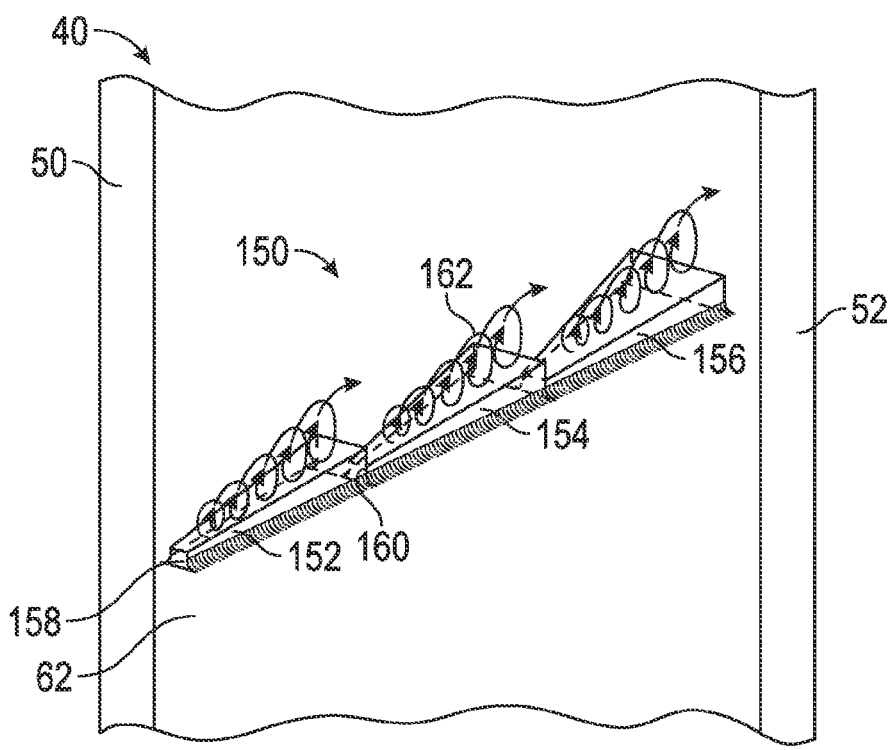
FIG. 8 is an illustration of a saw-tooth trip strip where the trip strip sections have a wedge-shape.

FIG. 8 is an illustration of a portion of the blade 40 showing a portion of the channel portion 64 which is similar to the illustration shown in FIG. 7. In this embodiment, a trip strip 150 is provided including three trip strip sections 152, 154 and 156 similar to the trip strip sections 132, 134 and 136, but where the trip strip sections 152, 154 and 156 have a wedge-shape where the width of a leading edge 158 of the trip strip sections 152, 154 and 156 is narrower than a trailing edge 160 of the particular trip strip section 152, 154 or 156. This configuration of the trip strip sections creates a much smaller geometry at the leading edges of each saw-tooth section or the junction of each tooth.

Figure 9:
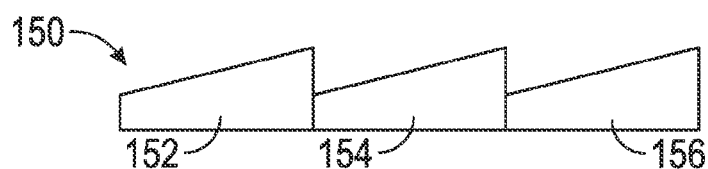
FIG. 9 is a top view or a side view of the trip strip shown in FIG. 8.

The "wedge" shape of the sections 152, 154 and 156 is more specifically defined as a "half wedge" shape where only one transverse edge of the section is angled. More particularly, the front transverse edge of the sections 152, 154 and 156 that receives the airflow first is flat (without transitions between sections) along the length of the entire trip strip 150, where the opposite edge of the sections 152, 154 and 156 is angled so as to provide a clean surface for the incoming flow. This is further illustrated by FIG. 9 which depicts both a front view and a top view of the trip strip 150. FIG. 9 is a general representation showing the transitions between the sections 152, 154 and 156, without specific dimensions for the rise of each section 152, 154 or 156 or a difference in the width of each section 152, 154 or 156 between the leading edge 158 of the section and the trailing edge 160 of the section.

In operation, the cooling airflow that is tripped at the leading edge 158 of the first trip strip section 152 creates a vortex 162 that rolls along the length of the trip strip section 152. However, this newly formed vortex 162 will be pushed away from the leading edge 158 of the trip strip section 152. A second new boundary layer tripping effect is generated at the leading edge 158 of the next trip strip section 154, which eliminates the interaction of the vortices between the old vortex and the newly formed vortex by the incoming cooling flow along the turbulent promoter, thus creating a much more effective way of tripping the boundary layer and inducing a much higher heat transfer augmentation.

The foregoing discussion discloses and describes merely exemplary embodiments of the present invention. One skilled in the art will readily recognize from such discussion, and from the accompanying drawings and claims, that various changes, modifications and variations can be made therein without departing from the scope of the invention as defined in the following claims.

What is claimed is:

1. A blade for a gas turbine engine, said blade comprising:
an outer housing wall defining an enclosure;
a plurality of ribs extending at least a portion of a length of the blade within the enclosure and defining a serpentine flow channel that allows a cooling airflow to flow from a proximal end to a distal end of the enclosure, wherein the proximal end is adjacent to an attachment portion and the distal end is opposite to the attachment portion, said attachment portion being configured to allow the blade to be securely mounted to a rotor; and
a plurality of spaced apart trip strips formed to an inside surface of the outer housing wall and extending into the flow channel, each trip strip including a plurality of trip strip sections each having a leading edge and a trailing edge where a trailing edge of one trip strip section is directly coupled to a leading edge of a next trip strip section, said trip strip sections being ramped sections where the leading edge of the trip strip section is shorter in height than the trailing edge of the trip strip section so that trip strip defines a general saw-tooth configuration.

2. The blade according to claim 1 wherein each trip strip includes three trip strip sections that are aligned end-to-end.

3. The blade according to claim 1 wherein each trip strip section has the same width along a length of the trip strip section.

4. The blade according to claim 1 wherein each trip strip section has a wedge shape where the leading edge of the trip strip section is narrower in width than the trailing edge of the trip strip section.

5. The blade according to claim 4 wherein the wedge shape is a half wedge shape where a front edge of the trip strip section is straight and a back edge of the trip strip section is angled.

6. The blade according to claim 1 wherein the leading edge of each trip strip section has the same height and the trailing edge of each trip strip section has the same height.

7. The blade according to claim 1 wherein the trip strip is a skewed trip strip.

8. The blade according to claim 1 wherein a length of the trip strip is curved to conform to a curved shape of the outer housing wall.

9. The blade according to claim 1 wherein the blade is part of a second row of blades in a turbine section of the gas turbine engine.

10. The blade according to claim 1 wherein each trip strip is formed from a metal.

11. A trip strip for creating a turbulated air flow in a cooling fluid flow channel, said trip strip comprising a plurality of trip strip sections each having a leading edge and a trailing edge where a trailing edge of one trip strip section is directly coupled to a leading edge of a next trip strip section, said trip strip sections being ramped sections where the leading edge of the trip strip section is shorter in height than a trailing edge of the trip strip section so that the trip strip defines a general saw-tooth configuration.

12. The trip strip according to claim 11 wherein each trip strip section has the same width along a length of the trip strip section.

13. The trip strip according to claim 11 wherein each trip strip section has a wedge shape where the leading edge of the trip strip section is narrower in width than the trailing edge of the trip strip section.

14. The trip strip according to claim 13 wherein the wedge shape is a half wedge shape where a front edge of the trip strip section is straight and a back edge of the trip strip section is angled.

15. The trip strip according to claim 11 wherein the leading edge of each trip strip section has the same height and the trailing edge of each trip strip section has the same height.

16. The trip strip according to claim 11 wherein the trip strip is a skewed trip strip.

17. The trip strip according to claim 11 wherein each trip strip includes three trip strip sections that are aligned end-to-end.

18. The trip strip according to claim 11 wherein the cooling fluid flow channel is provided within a blade for a gas turbine engine.

19. A blade for a gas turbine engine, said blade comprising:
an outer housing wall defining an enclosure;
a plurality of ribs extending at least a portion of a length of the blade within the enclosure and defining a serpentine flow channel that allows a cooling airflow to flow from a proximal end to a distal end of the enclosure, wherein the proximal end is adjacent to an attachment portion and the distal end is opposite to the attachment portion, said attachment portion being configured to allow the blade to be securely mounted to a rotor; and
a plurality of spaced apart and skewed trip strips formed to an inside surface of the outer housing wall and extending into the flow channel, each trip strip including three trip strip sections each having a leading edge and a trailing edge where a trailing edge of one trip strip section is directly coupled to a leading edge of a next trip strip section, said trip strip sections being ramped sections where the leading edge of the trip strip section is shorter in height than the trailing edge of the trip strip section so that trip strip defines a general saw-tooth configuration, wherein the leading edge of each trip strip section has the same height and the trailing edge of each trip strip section has the same height.

20. The blade according to claim 19 wherein each trip strip section has a wedge shape where the leading edge of the trip strip section is narrower in width than the trailing edge of the trip strip section.

\* \* \* \* \*